United States Patent [19]
Welles, II et al.

[11] Patent Number: 5,491,486
[45] Date of Patent: Feb. 13, 1996

[54] MOBILE TRACKING UNITS EMPLOYING MOTION SENSORS FOR REDUCING POWER CONSUMPTION THEREIN

[75] Inventors: Kenneth B. Welles, II, Scotia; Jerome J. Tiemann, Schenectady; Harold W. Tomlinson, Jr., Scotia, all of N.Y.

[73] Assignee: General Electric Company, Schenectady, N.Y.

[21] Appl. No.: 233,091

[22] Filed: Apr. 25, 1994

[51] Int. Cl.$^6$ .................................................. G01S 3/02
[52] U.S. Cl. ........................... 342/357; 342/457; 364/445
[58] Field of Search .................................... 342/357, 457; 364/445

[56] References Cited

U.S. PATENT DOCUMENTS

| | | | |
|---|---|---|---|
| 4,908,629 | 3/1990 | Apsell et al. | 342/457 |
| 5,003,317 | 3/1991 | Gray et al. | 342/457 |
| 5,129,605 | 7/1992 | Burns et al. | 246/5 |
| 5,218,367 | 6/1993 | sheffer et al. | 342/457 |
| 5,223,844 | 6/1993 | Mansell et al. | 342/357 |
| 5,225,842 | 7/1993 | Brown et al. | 342/357 |

OTHER PUBLICATIONS

"Swords into Plowshares" A Smart Approach to Freight Damage Prevention, GPS System, Communications Satellites, & New Accelerometer Technology, Help Railroads Improve Service, Tim Slifkin, Elexor Assoc. Inc. pp. 1–5.

Primary Examiner—Thomas H. Tarcza
Assistant Examiner—Dao L. Phan
Attorney, Agent, or Firm—Marvin Snyder

[57] ABSTRACT

A mobile tracking unit capable of operating in a power-starved environment for a vehicle tracking system includes a navigation set for generating data corresponding to a respective vehicle position. The navigation set is periodically energized at a selected activation rate $F_G$ while the vehicle is moving to generate the vehicle position data. The tracking unit includes an electromagnetic emitter which is capable of transmitting the vehicle position data and which is periodically energized at a selected activation rate $F_{EM}$ while the vehicle is moving to transmit at least the vehicle position data. A motion sensor is employed for generating data indicative of vehicle motion. A tracking unit controller receives the vehicle motion data and controls the navigation set and the emitter based upon the vehicle motion data so that when the vehicle is stationary each of activation rates $F_G$ and $F_{EM}$ can be respectively decreased by a predetermined factor, thus reducing the overall power consumption of the tracking unit. The tracking unit controller is further designed to return to activation rates $F_G$ and $F_{EM}$ upon the motion sensor sensing renewed vehicle motion, thus avoiding loss of vehicle position data during times of renewed vehicle motion.

28 Claims, 3 Drawing Sheets

MOBILE TRACKING UNITS EMPLOYING MOTION SENSORS FOR REDUCING POWER CONSUMPTION THEREIN

BACKGROUND OF THE INVENTION

The present invention relates to mobile tracking units for a vehicle tracking system and, more particularly, to mobile tracking units employing motion sensors for reducing power consumption therein under predetermined conditions.

A significant requirement for mobile tracking units used in vehicles which generally lack a power source, such as freight railcars, shipping containers and the like, is to have relatively low electrical power consumption characteristics. Mobile tracking units used in a power-starved environment must be substantially power efficient in order to provide reliable and economical operation. Typically, the mobile tracking unit includes a navigation set, such as a Global Positioning System (GPS) receiver or other suitable navigation set, responsive to navigation signals transmitted by a set of navigation stations which can be either space- or earth-based. In each case, the navigation set is capable of providing data indicative of the vehicle location based on the navigation signals. In addition, the mobile tracking unit can include a suitable electromagnetic emitter for transmitting to a remote location the vehicle position data and other data acquired with sensing elements in the vehicle. Since both the navigation set and the emitter are devices which, when energized, generally consume a large portion of the overall electrical power consumed by the mobile tracking unit, it is desirable to control the respective rates at which such devices are respectively activated so as to reduce the overall power consumption of the mobile tracking unit. For presently available mobile tracking units, use of a motion sensor, such as an accelerometer, has been suggested to detect shock or impact events which the vehicle encounters during routine use. However, no suggestion has been made of using the motion sensor for controlling the respective rates at which the aforementioned devices are activated so as to substantially reduce the overall power consumption of the mobile tracking unit.

SUMMARY OF THE INVENTION

Generally speaking, the present invention fulfills the foregoing needs by providing a mobile tracking unit capable of operating in a power-starved environment and suitable for a vehicle tracking system. The tracking unit includes a navigation set for generating data substantially corresponding to a respective vehicle position. The navigation set is periodically energized at a selected activation rate $F_G$ while the vehicle is moving to generate the vehicle position data. An electromagnetic emitter can be employed in the tracking unit for transmitting the vehicle position data, in which case such emitter is periodically energized at a selected activation rate $F_{EM}$, while the vehicle is moving, to transmit at least the vehicle position data. A motion sensor, such as an accelerometer or vibration sensor, is employed for generating data indicative of vehicle motion. A tracking unit controller is coupled to the motion sensor to receive the vehicle motion data and is designed to control the navigation set and the emitter based upon the vehicle motion data so that during times when the vehicle is substantially stationary, each of activation rates $F_G$ and $F_{EM}$ can be respectively decreased by a predetermined factor, thereby substantially reducing the overall power consumption of the tracking unit. The tracking unit controller is further designed to revert to activation rates $F_G$ and $F_{EM}$ upon an indication from the motion sensor of renewed vehicle motion, thereby avoiding any substantial loss of vehicle position data during times of renewed vehicle motion.

A method of operating a mobile tracking unit for a vehicle location system in accordance with the present invention can include the following steps: providing a navigation set capable of generating data substantially indicative of a respective vehicle position; periodically energizing the navigation set at a selected activation rate $F_G$ while the vehicle is moving to generate vehicle position data; providing an electromagnetic emitter (if optionally needed) capable of transmitting the vehicle position data; periodically energizing the electromagnetic emitter at a selected rate $F_{EM}$, while the vehicle is moving, to transmit at least the vehicle position data; generating data indicative of vehicle motion using a motion sensor; controlling the navigation set and the emitter based upon the vehicle motion data so that during times when the vehicle is substantially stationary, each of the activation rates $F_G$ and $F_{EM}$ is respectively decreased by a predetermined factor, thereby substantially reducing overall power consumption of tracking unit; and controlling the navigation set and the emitter to revert to activation rates $F_G$ and $F_{EM}$ upon an indication from the motion sensor of renewed vehicle motion, thereby avoiding any substantial loss of vehicle position data during times of renewed vehicle motion.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like numbers represent like pans throughout the drawings, and in which:

DETAILED DESCRIPTION OF THE INVENTION

The present invention provides mobile tracking units capable of operating in a power-starved environment. The mobile tracking units can be conveniently employed for a vehicle tracking or monitoring system which at least provides vehicle location information using navigation data derived from an existing navigation system, such as the Global Positioning System (GPS) satellite constellation, thereby providing highly accurate, real-time, vehicle tracking capability. It will be appreciated that the present invention is not limited to GPS navigation, being that vehicle tracking systems that use other navigation systems such as Loran, Omega, Transit and the like, or even satellite range measurement techniques (as respectively described in U.S. Pat. Nos. 4,161,730 and 4,161,734, both by R. E. Anderson, issued Jul. 17, 1979, both assigned to the present assignee, and herein incorporated by reference) can advantageously benefit from the use of a mobile tracking unit that employs a motion sensor in order to reduce the power consumption of the tracking unit. The tracking system is particularly useful in fleet vehicle management, railcar tracking, cargo location and the like. As used herein the term "vehicle" includes shipping containers and other such means of carrying or transporting goods on board a motorized vehicle or platform such as ships, aircrafts, land vehicles, or other vehicles.

Figure 1:
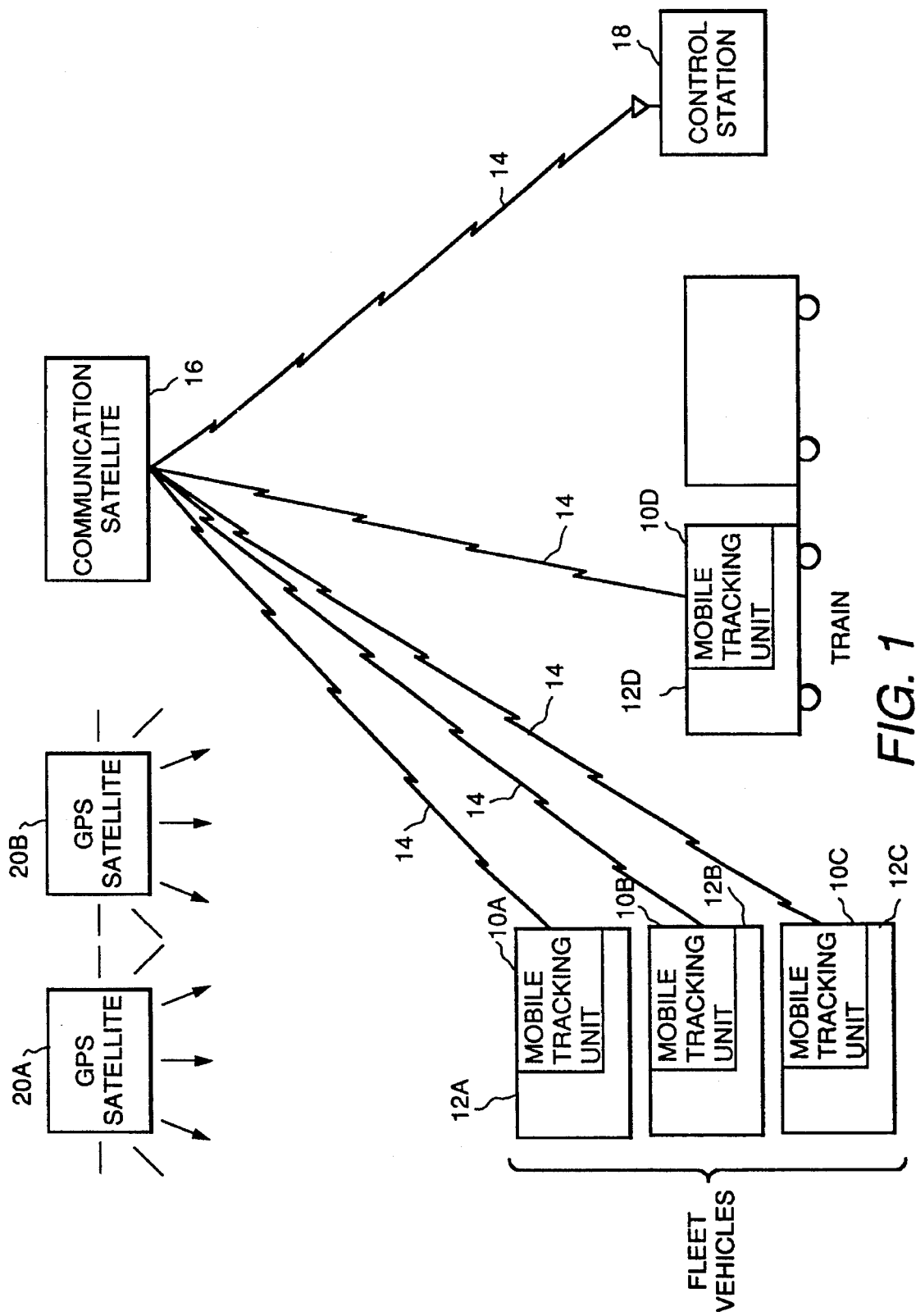
FIG. 1 is a block diagram of an exemplary vehicle tracking system which can employ a mobile tracking unit in accordance with the present invention.

FIG. 1 shows, by way of example and not of limitation, mobile tracking units which employ navigation signals from a GPS satellite constellation, although, as suggested above, other navigation systems can be used in lieu of GPS. FIG. 1 shows a set of mobile tracking units 10A–10D which are installed in respective vehicles 12A–12D which are to be tracked or monitored. A multiple communication link 14, such as a satellite communication link using a communication satellite 16, can be provided between each mobile tracking unit (hereinafter collectively designated as 10) and a remote control station 18 manned by one or more operators and having suitable display devices and the like for displaying location and status information for each vehicle equipped with a respective mobile tracking unit. A constellation of GPS satellites, such as GPS satellites 20A and 20B, provides highly accurate navigation signals which can be used to determine vehicle position and velocity when acquired by a suitable GPS receiver. Briefly, the GPS was developed by the U.S. Department of Defense and gradually placed into service throughout the 1980's. The GPS satellites constantly transmit radio signals in L-Band frequency using spread spectrum frequency techniques. The transmitted radio signals carry pseudo-random sequences which allow users to determine location relative to the surface of the earth (within approximately 100 ft), velocity (within about 0.1 MPH), and precise time information. GPS is a particularly attractive navigation system to employ, being that the respective orbits of the GPS satellites are chosen so as to provide substantially world-wide coverage and being that such highly-accurate radio signals are provided free of charge to users by the U.S. federal government. Communication link 14 can be conveniently used for transmitting vehicle conditions or events measured with suitable sensing elements, as will be explained shortly hereafter.

Figure 2:
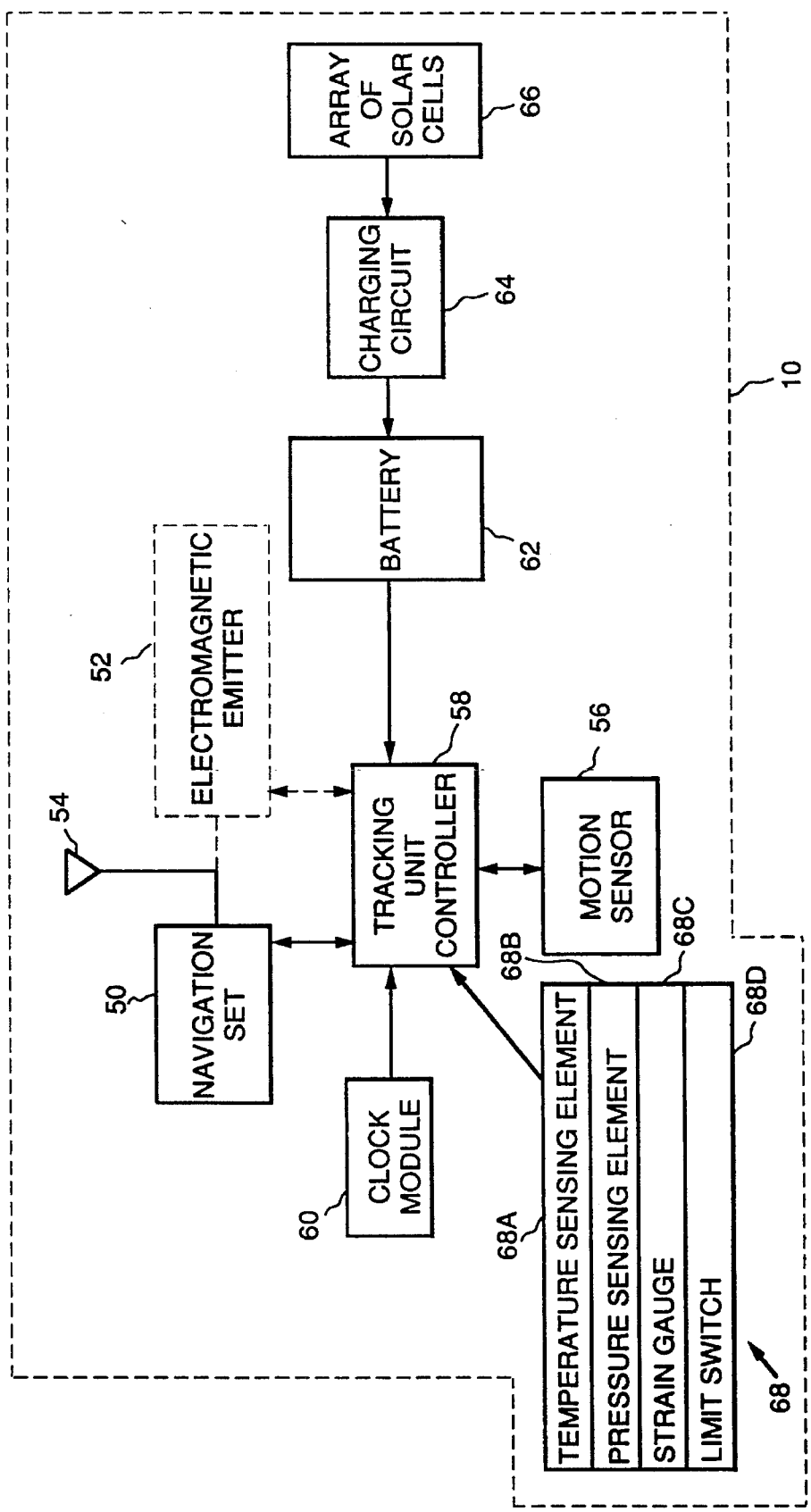
FIG. 2 is a block diagram illustrating further details of the mobile tracking unit shown in FIG. 1.

FIG. 2 shows that mobile tracking unit 10 includes a navigation set 50 capable of generating data substantially corresponding to the vehicle position. The navigation set is chosen depending on the particular navigation system used for supplying navigation signals to a given mobile tracking unit. Preferably, the navigation set is a GPS receiver such as a multichannel receiver. However, it should be apparent that other receivers designed for acquiring signals from a corresponding navigation system can also be employed. For example, the navigation set, depending on the vehicle position accuracy requirements, can be chosen as a Loran-C receiver or other such less highly-accurate navigation receiver than a GPS receiver. Further, as described in the foregoing incorporated by reference U.S. patents, the navigation set can conveniently comprise a transceiver that inherently provides two-way communication with the control station and avoids the need for separately operating an additional component to implement such two-way communication. Briefly, such transceiver would allow for implementation of the previously mentioned satellite range measurement techniques being that the position of the vehicle is simply determined at the control station by range measurements to the vehicle and the control station from two satellites whose position in space is known. In each case, it will be appreciated by those skilled in the art that the power consumed by the navigation set imposes a severe constraint for reliable and economical operation of the mobile tracking unit in vehicles which do not have power supplies like shipping containers, railcars used for carrying cargo and the like. For example, typical GPS receivers currently available generally consume as much as 2 watts of electrical power. In order for the GPS receiver to provide a position fix, the GPS receiver must be energized for a certain minimum period of time in order for the receiver to acquire sufficient signal information from a given set of GPS satellites so as to generate a navigation solution. A key advantage of the present invention is the ability to substantially reduce the overall power consumption of the mobile tracking unit by selectively reducing the activation or usage rate for the navigation set and other components of the mobile tracking unit. In particular, if, during times when the vehicle is stationary, the activation rate for the navigation set is reduced, then the overall power consumption of the mobile tracking unit can be substantially reduced, for example, by a factor of at least about 100. Mobile tracking unit 10 may include a suitable electromagnetic emitter 52 functionally independent from the navigation set. Emitter 52 is shown in dashed lines to indicate that such functionally independent component is only optional depending on the particular design implementation for the tracking unit. As suggested above, if the navigation set comprises a transceiver, then emitter 52 would be a redundant component. Emitter 52 is capable of transmitting the vehicle position data by way of communication link 14 (FIG. 1) to the control station. By way of example and not of limitation, if a GPS receiver is used, the GPS receiver and the emitter can be conveniently integrated as a single integrated unit for maximizing efficiency of installation and operation. An example of one such integrated unit is the commercially available Galaxy Inmarsat-C/GPS integrated unit available from Trimble Navigation, Sunnyvale, Calif. which is conveniently designed for data communication and position reporting between the control station and the mobile tracking unit. A single, low profile antenna 54 can be conveniently used for both GPS signal acquisition and satellite communication.

Regardless of the type of navigation set employed, and consistent with a key advantage of the present invention, a motion sensor 56, such as a low power accelerometer, vibration sensor, acoustical sensor or combination thereof, is coupled to a tracking unit controller 58 so as to supply to controller 58 data indicative of vehicle motion, preferably along three mutually orthogonal axes, i.e., the motion sensor is preferably a triaxial accelerometer. A set of three accelerometers individually integrated with suitable signal conditioning circuitry in a respective single monolithic integrated circuit, such as accelerometer model ADXL50 available from Analog Devices, Norwood, Mass. or similar accelerometers, can be conveniently mounted in the vehicle or in the tracking unit to provide such triaxial sensing. The tracking unit controller may comprise a multi-bit single chip digital microcontroller suitably programmed, as will be explained shortly hereafter, to control operation of navigation set 50 and emitter 52. A real-time clock module 60 can be connected to tracking unit controller 58 so as to periodically enable the controller to resume operation after the controller is in a "sleep-mode" associated with a low power mode of operation. Preferably, tracking unit controller 58 includes sufficient memory and throughput capability to process data acquired from a suite of respective sensing elements 68. A power source such as battery 62 is used to enable operation of mobile tracking unit 10. As shown in FIG. 2, battery 62 can be a rechargeable battery, such as a nickel-cadmium battery or a similar rechargeable battery, coupled to a suitable charging circuit 64 which receives electrical power from an array of solar cells 66 or other such electrical power transducer. The charging circuitry typically includes suitable charging regulators and voltage and current sensors (not shown) monitored by the controller for determining the condition of the battery. A backup battery (not shown) can be conveniently provided to enhance reliable operation of the mobile tracking unit. Alternatively, battery 62 can be a nonrechargeable battery replaced at preestablished time intervals. In each case, it will be appreciated that it is advantageous to reduce the overall power consumption of mobile tracking unit 10 so that, for example, in the case of a rechargeable battery, the size and cost requirements for charging circuit 64 and array of solar cells 66 can be conveniently reduced. Similarly, in the case of a nonrechargeable battery, reducing the power consumption of mobile tracking unit 10 advantageously allows for extending the useful life of the battery and to reduce maintenance costs associated with the mobile tracking unit.

As suggested above, the navigation set in order to provide the navigation solution required for determining vehicle location and velocity must be energized for a sufficient period of time to acquire the navigation signals which in the case of GPS are transmitted from any available set of GPS satellites. For example, depending on various initial conditions, such as availability of satellite ephemeris and almanac data, the GPS receiver may require to be energized for at least about 1 or 2 minutes in order to generate data for establishing a position fix. Similarly, the emitter must be energized for a respective period of time needed to transmit data associated with the vehicle. In each case, it will be apparent that it is advantageous to be able to selectively reduce the activation rate for the navigation set and (if a functionally independent emitter is used) the activation rate for the emitter depending on vehicle motion data generated with the motion sensor. As used herein the expression "activation rate" refers to the rate or frequency of use for a particular component in the mobile tracking unit. FIG. 2 illustrates in block diagram from respective exemplary sensing elements 68A–68D coupled to tracking unit controller 58 and used for measuring predetermined respective conditions associated with a given vehicle. Temperature sensing element 68A provides an economical way of measuring temperature in the vehicle. Pressure sensing element 68B can be used in tanker vehicles to measure the weight of the cargo. Strain gauge 68C can be used for measuring tensile or compressive forces in the vehicle which can provide particularly useful data in an accident postmortem investigation. Limit switch 68D can be used for actuation in response to a suitable mechanical input such as can be obtained from closing or opening doors. In each case, the data acquired with such sensing elements (collectively designated as suite of sensing elements 68 in FIG. 2) can be stored in tracking unit controller 58 and transmitted via communication link 14 together with the vehicle location data. Thus, it should be appreciated that the mobile tracking unit in accordance with the present invention conveniently provides enhanced useful data to users.

Figure 3:
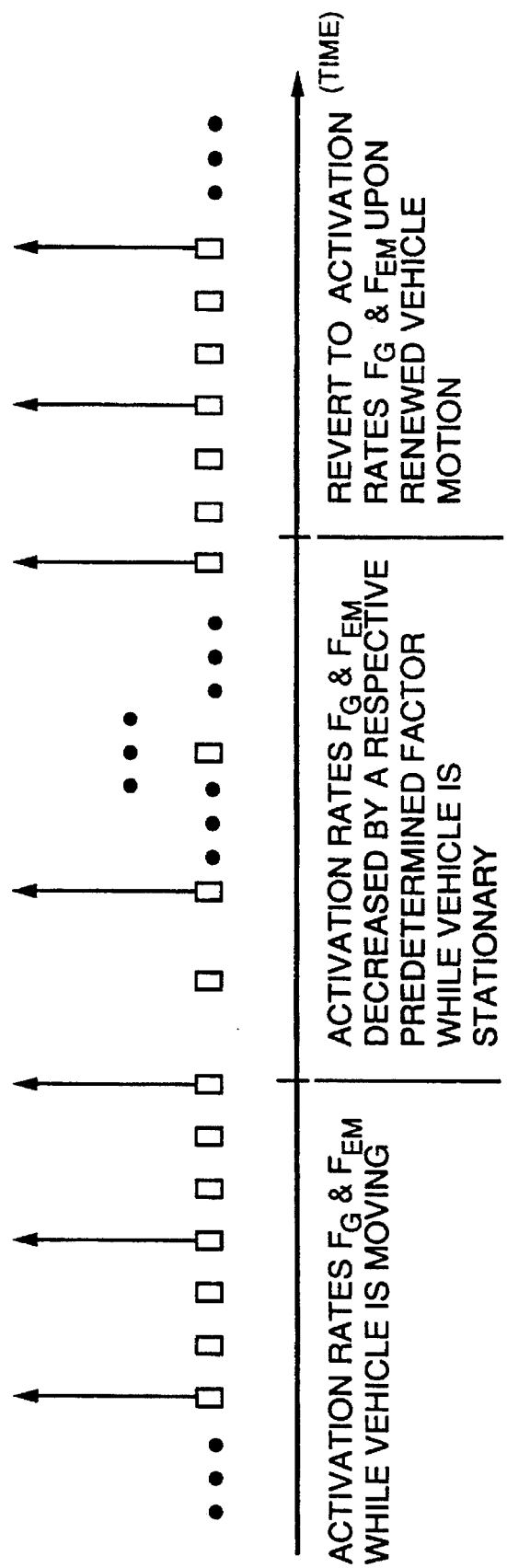
FIG. 3 is a graph showing respective exemplary activation rates for components of the mobile tracking unit wherein the activation rates are selected to reduce the overall power consumption of the mobile tracking unit in accordance with the present invention.

In FIG. 3, each rectangular block represents a period of time during which navigation set 50 (FIG. 2) is energized to generate vehicle position data. Similarly, each vertical arrow corresponds to respective times when emitter 52 (FIG. 2) is energized to transmit vehicle position data and other data associated with the vehicle if desired. It will be appreciated that during times while the vehicle is moving, activation rates $F_G$ and $F_{EM}$ can be respectively selected by tracking unit controller 58 (FIG. 2) in order to periodically energize the navigation set and the emitter, respectively. By way of example and not of limitation, in the case of a railcar vehicle using a GPS receiver, four GPS receiver activations per hour sufficient to generate four respective position fixes per hour may be adequate to substantially track the location of the railcar vehicle. Again, in the case of a railcar vehicle, one emitter activation per hour may be sufficient to transmit data acquired by the mobile tracking unit within the last hour so as to adequately report the vehicle position data (i.e., the last four position fixes) and other data acquired with suite of sensing elements 68. FIG. 3 further illustrates, in accordance with a key advantage of the present invention, that when the vehicle motion data from the motion sensor indicates that the vehicle is substantially stationary, the tracking unit controller can advantageously decrease each of the respective activation rates ($F_G$ and $F_{EM}$) for the GPS receiver and the emitter by a predetermined respective factor whose value can be conveniently chosen depending on the specific application. Various schemes are possible, for example, the activation rates may be gradually decreased so as to provide a gradual transition from activation rates $F_G$ and $F_{EM}$ to the decreased activation rates. In each case, such decreased activation rates individually contribute to substantially reducing the overall power consumption of the mobile tracking unit being that, in the case of railroad transportation for example, the average railcar in North America is stationary for approximately at least 90% of the time. Preferably, the navigation set and emitter are not completely deactivated even when the vehicle is stationary for a long period of time so as to provide increased reliability of operation. For example, this would prevent an erroneous determination that the vehicle is stationary when in fact the vehicle is moving, in case of a failure associated with the motion sensor. FIG. 3 also illustrates that upon the motion sensor indicating renewed vehicle motion, the tracking controller can be programmed to control respective operation of the navigation set and emitter so as to revert to activation rates $F_G$ and $F_{EM}$, thus avoiding any substantial loss of vehicle position data during times of renewed vehicle motion.

A method of operating a mobile tracking unit in accordance with the present invention can include the steps of providing a navigation set 50 (FIG. 2) capable of generating data substantially corresponding to a respective vehicle position; periodically energizing the navigation set at a selected activation rate $F_G$ while the vehicle is moving to generate the vehicle position data; providing, if needed, an electromagnetic emitter 52 (FIG. 2) capable of transmitting the vehicle position data; periodically energizing the electromagnetic emitter at a selected rate $F_{EM}$, while the vehicle is moving, to transmit at least the vehicle position data; generating data indicative of vehicle motion using a motion sensor such as a triaxial accelerometer or vibration sensor; controlling the navigation set and the emitter based upon the vehicle motion data so that during times when the vehicle is substantially stationary each of the activation rates $F_G$ and $F_{EM}$ can be respectively decreased by a predetermined factor, thereby substantially reducing overall power consumption of the tracking unit; and controlling the navigation set and the emitter to revert to activation rates $F_G$ and $F_{EM}$ upon the vehicle motion data from the motion sensor indicating renewed vehicle motion, thereby avoiding any substantial loss of vehicle position data during times of renewed vehicle motion.

While only certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A mobile tracking unit for a vehicle location system, said tracking unit comprising:

a navigation set for generating data substantially indicative of a respective vehicle position, said navigation set being adapted to be periodically energized at a selected activation rate $F_G$ while the vehicle is moving to generate vehicle position data;

a motion sensor for generating data indicative of vehicle motion; and a tracking unit controller coupled to said motion sensor to receive the vehicle motion data, said tracking unit controller being adapted to control said navigation set based upon the vehicle motion data so that when the vehicle is substantially stationary the activation rate $F_G$ can be respectively decreased by a predetermined factor, thereby reducing overall power consumption of said tracking unit, said tracking unit controller being further adapted to revert to activation rate $F_G$ when said motion sensor indicates renewed vehicle motion, thereby avoiding any substantial loss of vehicle position data during renewed vehicle motion.

2. The mobile tracking unit of claim 1 wherein said navigation set comprises a navigation receiver and wherein the mobile tracking unit further includes an electromagnetic emitter adapted to be periodically energized at a selected activation rate $F_{EM}$ while the vehicle is moving for transmitting at least the vehicle position data, said tracking unit controller being adapted to control said emitter based upon the vehicle motion data so that when the vehicle is substantially stationary the activation rate $F_{EM}$ can be respectively decreased by a predetermined factor, thereby contributing to reducing the overall power consumption of said tracking unit, said tracking unit controller being further adapted to revert to activation rate $F_{EM}$ when said motion sensor indicates renewed vehicle motion, thereby allowing for transmitting at least the vehicle position data at rate $F_{EM}$ during renewed vehicle motion.

3. The mobile tracking unit of claim 2 wherein said navigation set comprises a GPS receiver.

4. The mobile tracking unit of claim 1 wherein said navigation set comprises a transceiver.

5. The mobile tracking unit of claim 1 wherein said motion sensor comprises an accelerometer.

6. The mobile tracking unit of claim 5 wherein said accelerometer comprises a triaxial accelerometer.

7. The mobile tracking unit of claim 1 wherein said motion sensor comprises a vibration sensor.

8. The mobile tracking unit of claim 1 wherein said motion sensor comprises an acoustical sensor.

9. The mobile tracking unit of claim 2 further including a suite of respective sensing elements coupled to said digital controller for measuring predetermined respective conditions associated with the vehicle.

10. The mobile tracking unit of claim 9 wherein said suite of sensing elements comprises at least one from the group consisting of a temperature sensing element, a pressure sensing element, a limit switch and a strain gauge.

11. The mobile tracking unit of claim 1 further comprising a power supply for electrically powering respective components of said mobile tracking unit.

12. The mobile tracking unit of claim 11 wherein said power supply comprises a battery operatively coupled to a charging unit for electrically charging said battery.

13. The mobile tracking unit of claim 12 wherein said charging unit includes an array of solar cells.

14. A mobile tracking unit for a vehicle location system, comprising:

a navigation set for generating data substantially corresponding to a respective vehicle position, said navigation set being adapted to be periodically energized at a selected activation rate $F_G$ while the vehicle is moving to generate vehicle position data;

an electromagnetic emitter adapted to be periodically energized at a selected activation rate $F_{EM}$ while the vehicle is moving, for transmitting at least the vehicle position data;

a motion sensor for generating data indicative of vehicle motion; and a tracking unit controller coupled to said motion sensor to receive the vehicle motion data, said tracking unit controller being adapted to control said navigation set and said emitter based upon the vehicle motion data so that during times when the vehicle is substantially stationary each of said activation rates $F_G$ and $F_{EM}$ can be respectively decreased by a predetermined factor, thereby reducing overall power consumption of said tracking unit, said tracking unit controller being further adapted to revert to activation rates $F_G$ and $F_{EM}$ when said motion sensor indicates renewed vehicle motion, thereby avoiding substantial loss of vehicle position data during renewed vehicle motion.

15. The mobile tracking unit of claim 14 wherein said navigation set comprises a GPS receiver.

16. The mobile tracking unit of claim 14 wherein said motion sensor comprises an accelerometer.

17. The mobile tracking unit of claim 16 wherein said accelerometer comprises a triaxial accelerometer.

18. The mobile tracking unit of claim 14 wherein said motion sensor comprises a vibration sensor.

19. The mobile tracking unit of claim 14 wherein said motion sensor comprises an acoustical sensor.

20. The mobile tracking unit of claim 14 further comprising a suite of respective sensing elements coupled to said digital controller for measuring respective additional conditions associated with the railcar vehicle.

21. The mobile tracking unit of claim 20 wherein said suite of sensing elements comprises at least one from the group consisting of a temperature sensing element, a pressure sensing element, a limit switch and a strain gauge.

22. The mobile tracking unit of claim 14 further comprising a power supply for electrically powering respective components of said mobile tracking unit.

23. The mobile tracking unit of claim 22 wherein said power supply comprises a battery operatively coupled to a charging unit for electrically charging said battery.

24. The mobile tracking unit of claim 23 wherein said charging unit includes an array of solar cells.

25. A method of operating a mobile tracking unit for a vehicle location system, said method comprising:

providing a navigation set capable of generating data substantially indicative of a respective vehicle position;

periodically energizing said navigation set at a selected activation rate $F_G$ while the vehicle is moving to generate vehicle position data;

generating data indicative of vehicle motion;

controlling said navigation set in accordance with the vehicle motion data so that when the vehicle is substantially stationary the activation rate $F_G$ can be respectively decreased by a predetermined factor, thereby reducing overall power consumption of said tracking unit; and controlling said navigation set in accordance with the vehicle motion data to revert to activation rate $F_G$ when the motion sensor indicates renewed vehicle motion, thereby avoiding substantial loss of vehicle position data during times of renewed vehicle motion.

26. The method in accordance with claim 25 wherein said navigation set is a GPS receiver.

27. The method in accordance with claim 25 wherein said navigation set is a transceiver.

28. The method in accordance with claim 26 further comprising the steps of:

providing an electromagnetic emitter capable of transmitting at least the vehicle position data;

periodically energizing said electromagnetic emitter at a selected activation rate $F_{EM}$ while the vehicle is moving for transmitting at least the vehicle position data;

controlling said emitter in accordance with the vehicle motion data so that when the vehicle is substantially stationary the activation rate $F_{EM}$ can be respectively decreased by a predetermined factor, thereby contributing to reduce the overall power consumption of said tracking unit; and controlling said emitter in accordance with the vehicle motion data to revert to activation rate $F_G$ when the motion sensor indicates renewed vehicle motion, so as to then transmit at least the vehicle position data at rate $F_{EM}$.

* * * * *